Feb. 28, 1956  E. F. RIESING  2,736,584
FLUID SEAL
Filed Dec. 5, 1952
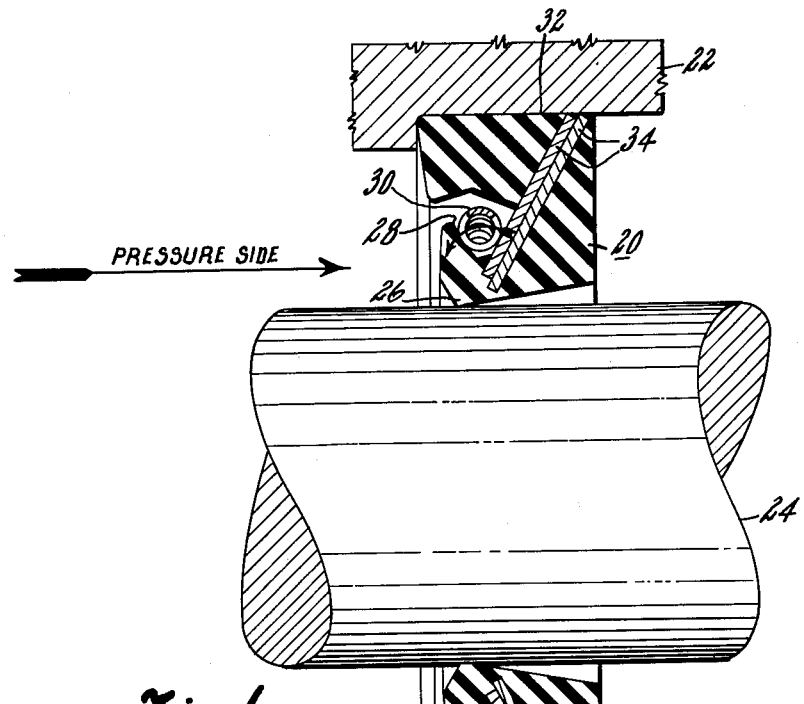
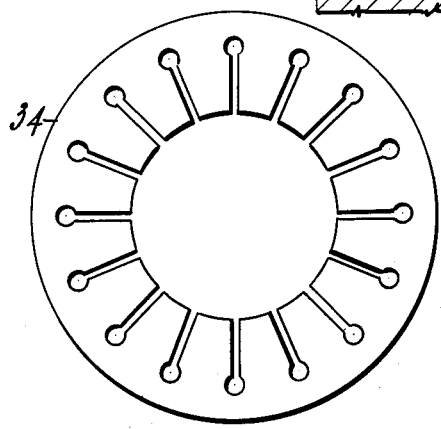
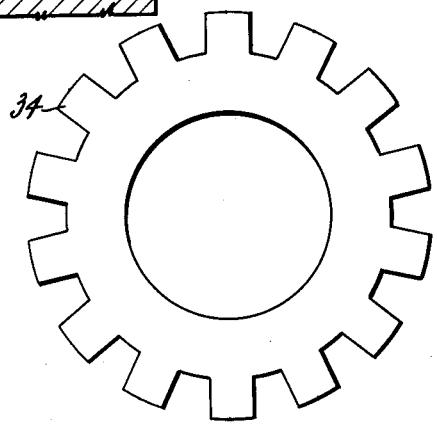
INVENTOR.
ELLWOOD F. RIESING
BY
ATTORNEYS

United States Patent Office 2,736,584
Patented Feb. 28, 1956

2,736,584
FLUID SEAL

Ellwood F. Riesing, Dayton, Ohio, assignor to General Motors Corporation, Detroit, Mich., a corporation of Delaware Application December 5, 1952, Serial No. 324,327

3 Claims. (Cl. 288—2)

This invention relates to a fluid seal and is particularly directed to a fluid seal of the radial type.

An object of the invention is to provide a fluid seal of the radial type with a reinforcing member molded therein which maintains the outer diameter of said seal and which stiffens the seal and improves the sealing efficiency thereof.

A still further object of the invention is to provide a spring-like reinforcing member formed from a plurality of leaves of either the Belleville or finger spring type.

Further objects and advantages of the present invention will be apparent from the following description, reference being had to the accompanying drawings, wherein preferred embodiments of the present invention are clearly shown.

In the drawings:

Fig. 1 is a view in cross section of a preferred type of seal installed between a shaft and a housing member.

Fig. 2 is a plan view of a Belleville type reinforcing member.

Fig. 3 is a plan view of a finger spring type of reinforcing member.

This invention is directed to somewhat similar matter to that shown in my copending application Serial No. 324,324 and shows an improved design of seal for use in applications where no shoulder is present in the housing member against which the seal may be seated.

It has long been a problem in seal applications to properly position a radial type seal within a housing wherein no seating shoulder is present in the housing. In such installations, the seal often becomes cocked in installation and even if properly installed upon an application of pressure, is misaligned with respect to the housing, which condition destroys the sealing efficiency thereof. The present invention attacks the problem in a different manner wherein a plurality of leaf spring reinforcements are provided within the seal, which leaf spring reinforcements are positioned so that upon application of pressure against the seal, said reinforcements tend to expand and tighten the grip of the seal upon the housing wall for maintaining the sealing efficiency thereof.

Referring particularly to the drawings, a cylindrical housing 22 is shown having a shaft 24 journaled therein. The shaft 24 is sealed from the housing 22 by a seal 20 which includes a sealing lip 26 having a groove 28 therein which receives a garter spring 30. The outer periphery 32 of the seal 20 is a snug fit against the housing wall 22. Within the main body portion of the seal 20 is molded a plurality of plate-like springs 34 in juxtaposed relation to one another. These plate-like springs 34 are of a truncated conical shape and form one side of the spring groove 28, which disposition of the springs permits easy positioning thereof within the mold. The right hand spring is slightly longer than the left hand spring and both springs extend substantially from one side of the seal 20 to the other thereof. It will be noted that the springs 34 extend to the outer diameter of the seal 20 so as to rub against the housing 22 during insertion of the seal. The smaller diameter end of the truncated cone of the spring is positioned toward the pressure side of the application whereby as pressure is applied, the springs tend to move one against the other and bite into the housing 22 at the outside thereof while simultaneously moving the sealing lip 26 into tight engagement with the shaft 24. Thus the higher the pressure, the more firmly is the seal 20 held within the housing.

I have found that the spring 34 may be either of the Belleville type as shown in Fig. 2 or of a finger spring type as shown in Fig. 3. Either type of plate spring yields satisfactory results. In either case, the springs should be indexed in the mold so as to permit flow of elastomer through the radial interruptions thereof. Exact alignment is not necessary so long as the elastomer is at least partially continuous from one side to the other.

While the embodiments of the present invention as herein disclosed, constitute preferred forms, it is to be understood that other forms might be adopted.

What is claimed is as follows:

1. A fluid seal of the radial type adapted to seal a rotating member within a non-rotating member, comprising in combination; an annular body member made from elastomeric material including an annular flexible sealing lip at its inner periphery and disposed adjacent one side thereof and adapted to sealingly engage the rotating member, said sealing lip having an annular spring receiving groove therearound, a garter spring positioned within said groove for increasing the sealing pressure of the lip against said rotating member, an outer annular portion on said body member adapted to be press-fitted within said non-rotating member in sealing engagement therewith, and at least two plate-like spring reinforcements of truncated conical shape nested together in juxtaposed relation and molded within the body member, said spring-like reinforcements being positioned and arranged with their largest diameter edges closely adjacent the outer surface of said outer annular portion of the body member at the side thereof opposite to said sealing lip and their smaller diameter edges adjacent the groove in said sealing lip wherein at least a portion of one of said plate-like springs is exposed within said groove.

2. The seal as claimed in claim 1, wherein plate-like springs are Belleville type springs.

3. The seal as claimed in claim 1, wherein the plate-like springs are finger type springs.

References Cited in the file of this patent

UNITED STATES PATENTS

| | | |
|---|---|---|
| 2,107,974 | Bechereau et al. | Feb. 8, 1938 |
| 2,162,104 | Mosher | June 13, 1939 |
| 2,330,104 | Antonelli | Sept. 21, 1943 |
| 2,468,247 | Victor | Apr. 26, 1949 |
| 2,587,405 | Stevens et al. | Feb. 26, 1952 |